United States Patent [19]

Fauth et al.

[11] Patent Number: 5,378,779
[45] Date of Patent: Jan. 3, 1995

[54] REGULATING THE REACTION IN THE PREPARATION OF POLYISOBUTYLENE

[75] Inventors: Karl-Heinz Fauth, Wattenheim; Gunther Isbarn, Ludwigshafen, both of Germany

[73] Assignee: BASF Aktiengesellschaft, Ludwigshafen, Germany

[21] Appl. No.: 124,031

[22] Filed: Sep. 21, 1993

[30] Foreign Application Priority Data

Sep. 23, 1992 [DE] Germany ............... 4231748

[51] Int. Cl.$^6$ ............... C08F 4/14; C08F 110/10
[52] U.S. Cl. ............... 526/209; 526/237; 526/348.7; 526/70; 526/90
[58] Field of Search ............... 526/209, 237, 90, 70, 526/348.7

[56] References Cited

U.S. PATENT DOCUMENTS

| | | | |
|---|---|---|---|
| 2,384,916 | 9/1945 | Holmes | 526/209 |
| 2,559,062 | 7/1951 | Dorate | 526/237 X |
| 2,637,720 | 5/1953 | Schneider et al. | 260/82 |
| 3,726,832 | 4/1973 | Komotsu et al. | 526/336 X |
| 4,691,072 | 9/1987 | Schick et al. | 585/525 |
| 4,929,683 | 5/1990 | Kennedy et al. | 525/268 |
| 5,068,490 | 11/1991 | Eaton | 585/525 |
| 5,254,649 | 10/1993 | Miln et al. | 526/211 |

FOREIGN PATENT DOCUMENTS 641284  1/1937  Germany.

OTHER PUBLICATIONS

Pat. Abst. of Japan, vol. 14, No. 4941 (C-77) (English abstract of JP-A 52 151 381).

Primary Examiner—Mark Nagumo
Attorney, Agent, or Firm—Keil & Weinkauf

[57] ABSTRACT

A process for regulating the reaction in the preparation of polyisobutylene by polymerizing isobutylene at from $-130°$ to $0°$ C. in the presence of from 0.01 to 1.0% by weight of a Friedel-Crafts catalyst, from 0.0001 to 0.1% by weight of a molecular weight regulator, and a low boiling point solvent that is inert under the reaction conditions, the percentages by weight being based in each case on isobutylene, in which the solvent that has evaporated in the polymerization is continuously removed, liquefied and recycled in the liquid state to the polymerization zone, wherein vinyl ethers are used as molecular weight regulators. The vinyl ether used in this process acts both as an accelerator and an inhibitor of the cationic polymerization.

2 Claims, No Drawings

REGULATING THE REACTION IN THE PREPARATION OF POLYISOBUTYLENE

The present invention relates to a process for regulating the reaction in the preparation of polyisobutylene by polymerizing isobutylene at from $-130°$ to $0°$ C. in the presence of from 0.01 to 1.0% by weight of a Friedel-Crafts catalyst, from 0.0001 to 0.1% by weight of a molecular weight regulator, and a low boiling point solvent that is inert under the reaction conditions, the percentages by weight being based in each case on isobutylene, in which the solvent that has evaporated in the polymerization is continuously removed, liquefied, and recycled in the liquid state to the polymerization zone.

It is known that the cationic polymerization of isobutylene can be either accelerated or inhibited by adding regulators ("Polyisobutylene", H. Güterbock, Springer-Verlag, Berlin, Göttingen, Heidelberg, 1959). Accelerators that are added in small amounts effect an activation of the catalysts and thus an acceleration of the reaction, the acceleration being associated with an increase in the molecular weight. They are according to their chemical nature proton donors, which together with the Friedel-Crafts catalyst normally employed form a positively charged complex which in turn may be described as the actual catalyst for the cationic polymerization of isobutylene. Examples of accelerators that are used include acids, aldehydes, alcohols or water.

Inhibitors produce an opposite effect, namely a prolongation of the reaction time and a decrease in molecular weight. The inhibiting action of 1-butene in the cationic polymerization of isobutylene has been known for a long time (DE-C 641 284). In the preparation of polyisobutylene two different molecular weight regulators are often used, i.e. an accelerator as well as an inhibitor, their effects being suitably controlled by the quantitative ratios employed.

The hitherto conventional technical process for preparing polyisobutylenes is described in DE-A 3 527 551, in which, inter alia, about 2% by weight of 1-butene is added as inhibitor to the isobutylene. An alcohol is frequently used as an accelerator at the same time as the 1-butene in this process. The 1-butene does not participate in the cationic polymerization, but is recovered almost quantitatively in the solvent/circulating gas after the polymerization. The process described in this laid-open application has the disadvantage that the 1-butene is then separated from the solvent/circulating gas and either has to be burnt or purified in a complex and costly manner before being re-used. Furthermore, the addition of about 2% by weight of 1-butene as regulator is somewhat complicated as regards process technology.

It is an object of the present invention to develop an improved process for regulating the reaction in the preparation of polyisobutylene that does not exhibit the aforementioned disadvantages and in which the addition of relatively large amounts of a molecular weight regulator can be dispensed with.

We have found that this object is achieved by the process defined at the beginning for regulating the reaction in the preparation of polyisobutylene.

Vinyl ethers are used as molecular weight regulators in this process according to the invention. Preferably, vinyl ethers of the formula (I)

$$R—O—CH=CH_2 \qquad (I)$$

in which R is a $C_1–C_8$-alkyl group, in particular a $C_3–C_5$-alkyl group, are used as molecular weight regulators. Particularly preferred molecular weight regulators that should be mentioned in this connection are isobutyl vinyl ether and tert-butyl vinyl ether. The molecular weight regulators to be used according to the invention act both as accelerators and as inhibitors of the cationic polymerization. Such vinyl ethers can be synthesized by processes known to the person skilled in the art.

Processes for preparing polyisobutylene are known in particular from DE-A 3 527 551, and accordingly reference may be made to this laid-open application for further details. The process according to the invention for regulating the reaction in the preparation of polyisobutylene can be used for the types of cationic polymerization usually employed in industry. The process according to the invention is suitable for both continuous and batchwise cationic polymerization and can be carried out as gas phase polymerization, solution polymerization or suspension polymerization in conventional reactors. It is particularly suitable, inter alia, for cationic isobutylene polymerization by the belt process in which isobutylene is cationically polymerized in pure, dry, liquid ethylene on a slightly inclined, endless steel belt. Further particularly preferred processes for cationic isobutylene polymerization in which the process according to the invention may advantageously be employed are described in Ullmanns Encyklopädie der technischen Chemie, Verlag Chemie GmbH, Weinheim, 1980, in Vol. 19, pp. 216–223.

The cationic isobutylene polymerization is usually carried out by the process of the invention at from $-130°$ to $0°$ C., in particular at the boiling point of liquid ethene ($-103.7°$ C.).

It advantageously takes place in the presence of from 0.01 to 1.0% by weight, in particular in the presence of from 0.02 to 1.0% by weight, of a Friedel-Crafts catalyst, the percentages by weight being based in each case on isobutylene. Preferred Friedel-Crafts catalysts in this connection include, in addition to boron trifluoride, boron trichloride, boron tribromide and boron triiodide, also, inter alia, tin, titanium, aluminum, antimony and iron halides, boron trifluoride being particularly preferred.

In addition, according to the process of the invention from 0.0001 to 0.1% by weight, in particular from 0.0005 to 0.08% by weight, of a vinyl ether is used as molecular weight regulator, these amounts also being based on isobutylene. Depending on the amount in which it is used, the vinyl ether can act as an accelerator as well as an inhibitor of the cationic polymerization. In general it is found that vinyl ether concentrations of less than 0.05% by weight have an accelerating effect, whereas higher vinyl ether concentrations have an inhibiting effect. In the process of the invention it may also be advisable to use, in addition to the vinyl ether, up to 4% by weight, in particular up to 1% by weight, of conventional accelerators, for example acids, aldehydes, alcohols or water. In many cases, however, the process according to the invention does not require further accelerators.

Solvents normally used in the process according to the invention are low boiling point solvents that are inert under the reaction conditions, for example methane, ethane, propane and, in particular, ethylene. These solvents are particularly suitable since, among other things, the heat of polymerization of the isobutylene can be removed in a simple manner by partial evaporation of the solvents under the conditions of the cationic polymerization. The solvent that has evaporated during the polymerization is, according to the process of the invention, continuously removed, liquefied and recycled in the liquid state to the polymerization zone. The solvents therefore also act at the same time as coolant. In general the reaction mixture of the process according to the invention contains from 30 to 90% by weight, in particular from 50 to 70% by weight, of solvents, the amounts in turn being based on the isobutylene.

By means of the process according to the invention the desired reaction rate and also the desired molecular weight of the polyisobutylenes can be controlled by simple adjustment of the specific vinyl ether amounts. On account of the fact that only one reaction regulator is used as both accelerator and inhibitor, the process according to the invention is less complicated than the prior art processes. The desired smooth course of the reaction in the cationic isobutylene polymerization can readily be adjusted by the amounts of the vinyl ethers used. A further advantage of the process according to the invention, in which only relatively small amounts of vinyl ethers are used, is that relatively large amounts of molecular weight regulators, for example 1-butene, no longer have to be separated from the solvent/circulating gas and burnt or worked up by distillation.

The process according to the invention is suitable in particular for preparing polyisobutylene by cationic isobutylene polymerization. The polyisobutylenes obtainable in this way have viscosity average molecular weights ($\overline{M}_v$) of $10^5$ to $10^7$, in particular $0.2 \times 10^6$ to $0.8 \times 10^7$. These high molecular weight polyisobutylenes are processable at from about 150° to 200° C.

EXAMPLES 1 TO 7 AND COMPARATIVE EXAMPLE A

Isobutylene was polymerized in pure liquid ethylene in a 400 ml capacity reaction vessel. The reaction temperature was −103.7° C. Based on the isobutylene, 65% by weight of ethylene as solvent and 0.2% by weight of boron trifluoride as Friedel-Crafts catalyst were used. The evaporated ethylene was continuously removed during the polymerization.

The following table shows, for Examples 1 to 7 according to the invention and also the comparative example, in each case the amount of molecular weight regulator added (tert-butyl vinyl ether was used), the reaction incubation time, the overall reaction time, the yield, and also the molecular weight and color of the resultant polyisobutylene. Remarks on the course of the reaction are also given in each case. No molecular weight regulator was used in Comparative example A.

The molecular weight of the resultant polyisobutylene was determined by viscosity measurements (according to DIN 51 562).

TABLE

|  | Amount of tert-butyl vinyl ether used [% by weight] | Reaction incubation [sec] | Reaction time [sec] | Yield [%] | Molecular weight $[\overline{M}_v] \times 10^6$ | Color of the polymer | Course of the reaction |
| --- | --- | --- | --- | --- | --- | --- | --- |
| Comparative Example A | 0 | 1.7 | 12 | 99.25 | 8.0 | colorless | smooth |
| Example 1 | 0.0005 | 1.4 | 11 | 99.60 | 8.5 | colorless | smooth |
| Example 2 | 0.0010 | 1.4 | 9 | 99.30 | 8.0 | colorless | less smooth |
| Example 3 | 0.0025 | 1.4 | 6 | 99.60 | 6.0 | yellow | vigorous |
| Example 4 | 0.0050 | 1.3 | 5 | 99.20 | 4.0 | light brown | violent |
| Example 5 | 0.0100 | 1.6 | 9 | 99.50 | 3.7 | light brown | smooth |
| Example 6 | 0.0250 | 7 | 177 | 97.50 | 1.7 | brown | smooth |
| Example 7 | 0.0500 | 15 | 323 | 87.50 | 0.3 | dark brown | too slow |

It can be seen from Examples 1 to 7 and Comparative Example A, inter alia, that the addition of relatively small amounts of tert-butyl vinyl ether first of all leads to an acceleration of the reaction (reduction in reaction time), which is accompanied by a very high yield (see Examples 1 and 2 compared with Comparative Example A). With increasing amounts of tert-butyl vinyl ether an increasingly vigorous reaction (Examples 3 and 4) is observed, combined with very high yields and a further acceleration of the reaction. With even higher amounts of tert-butyl vinyl ether the reaction becomes less vigorous, and at the same time a marked decrease in the reaction rate and a gradual drop in yield are observed (Examples 5 to 7). In these cases the tert-butyl vinyl ether acts increasingly as an inhibitor of the cationic isobutylene polymerization.

We claim:

1. A process for regulating the reaction in the preparation of polyisobutylene by polymerizing isobutylene at from −130° C. to 0° C. in the presence of from 0.01 to 1.0% by weight of boron trifluoride, from 0.0001 to 0.005% by weight of a molecular weight regulator, and a low boiling solvent that is inert under the reaction conditions, the percentages by weight being based in each case on isobutylene, in which the solvent that has evaporated in the polymerization is continuously removed, liquefied and recycled in the liquid state to the polymerization zone, wherein isobutyl vinyl ether or tert-butyl vinyl ether is used as molecular weight regulator.

2. A process as claimed in claim 1, wherein the molecular weight regulator is tert-butyl vinyl ether and is used in amounts of from 0.0005 to 0.0025% by weight, based on isobutylene.

* * * * *